United States Patent [19]

Noguchi

[11] Patent Number: 4,987,532
[45] Date of Patent: Jan. 22, 1991

[54] ELECTRONIC COMPUTER SYSTEM WITH MEANS FOR ISSUING A NON-STORE REQUEST BEFORE EXECUTING STATE TRANSITION PROSECUTION

[75] Inventor: Takayuki Noguchi, Tokyo, Japan
[73] Assignee: NEC Corporation, Tokyo, Japan
[21] Appl. No.: 358,805
[22] Filed: May 31, 1989
[30] Foreign Application Priority Data May 31, 1988 [JP] Japan .............................. 63-134843

[51] Int. Cl.⁵ .............................................. G06F 9/22
[52] U.S. Cl. ................................ 364/200; 364/238.4; 364/244; 364/244.6; 364/262.8
[58] Field of Search ... 364/200 MS File, 900 MS File

[56] References Cited

U.S. PATENT DOCUMENTS

| | | | |
|---|---|---|---|
| 4,048,481 | 9/1977 | Bailey, Jr. et al. | 364/200 |
| 4,109,310 | 8/1978 | England et al. | 364/200 |
| 4,109,311 | 8/1978 | Blum et al. | 364/200 |
| 4,300,193 | 11/1981 | Bradley et al. | 364/200 |
| 4,321,665 | 3/1982 | Shen et al. | 364/200 |
| 4,387,423 | 6/1983 | King et al. | 364/200 |

*Primary Examiner*—Raulfe B. Zache
*Attorney, Agent, or Firm*—Foley & Lardner, Schwartz, Jeffery, Schwaab, Mack, Blumenthal & Evans

[57] ABSTRACT

In a computer system of a microprogram control type which processes a succession of instructions to produce a succession of store data units and a succession of store requests under control by a microprogram controller, the store data units being written into a memory by control of a memory controller according to the store requests, a specific one of the instructions being retried from a checkpoint on occurrence of an error during current processing of the specific instruction, the microprogram controller controls execution of a state transition which results in cancellation of the checkpoint on occurrence of the state transition during processing the specific instruction. In order to enable execution of the state transition without waiting for completion of writing previous store data units into the memory according to the store requests issued prior to the occurrence of the state transition, the microprogram controller comprises a control program for producing a non-store imitative request in place of the store request and an imitative store data unit and then producing an indication for executing the state transition. On occurence of the error, the memory controller produces a retry request in absence of the non-store store request and produces a system down signal in the presence of the non-store request.

3 Claims, 2 Drawing Sheets

ELECTRONIC COMPUTER SYSTEM WITH MEANS FOR ISSUING A NON-STORE REQUEST BEFORE EXECUTING STATE TRANSITION PROSECUTION

BACKGROUND OF THE INVENTION

1. Field of the Invention

The present invention relates to an electronic computer system of a microprogram control type capable of retrying, on occurrence of an error during execution of an instruction, the instruction from a checkpoint established at a predetermined microstep and, in particular, to control of execution of a state transition prosecution which causes cancellation of the checkpoint in such a microprogram control type electronic computer system.

2. Description of the Prior Art

A known electronic computer system comprises a main memory for storing a plurality of programs and data and a processor for processing the programs. Each program comprises a succession of instructions. The processor comprises an instruction controller, an executing portion, a microprogram controller, a store request producing portion and a main memory controller.

The instruction controller successively fetches selected instructions from the main memory and interprets them. Each of the fetched instructions are delivered to the executing portion as a delivered instruction while an execution request for the delivered instruction is delivered to the microprogram controller.

The executing portion successively executes the delivered instruction according to microsteps of a microprogram by the microprogram controller responsive to the execution request and produces a succession of store data units and a succession of corresponding store indications.

The store request producing portion is coupled to the executing portion and the microprogram controller and produces a succession of store requests corresponding to the store data units under control of the microprogram controller.

The main memory controller is connected to the execution portion, the store request producing portion and the main memory, and successively buffers the store requests as buffered store requests and also buffers the succession of store data units as buffered store data units in response to the store indications one after another. Responsive to successive write enabling signals from the main memory, the main memory controller successively delivers the buffered store requests together with the buffered store data units to the main memory so as to write the buffered store data units into the main memory.

Responsive to the execution request, the microprogram controller establishes a checkpoint at a start point of the microprogram control for the delivered instruction so as to enable the executing portion to retry the delivered instruction from the checkpoint when an error occurs during execution of the delivered instruction.

Among the instructions, there is a specific instruction having the state transition prosecution execution which results in cancellation of the checkpoint. Generally, the specific instruction is an instruction having a prosecution for requiring a mode switching of a program from one to another, for example, a switching from a guest operation system (OS) of a virtual machine to a monitor one, a switching from a program application of a usual OS to a monitor of the OS, and others.

Since the checkpoint is cancelled by execution of the state transition prosecution, it is impossible to retry the instruction from the checkpoint. Therefore, on occurrence of the state transition prosecution during execution of the instruction, the microprogram controller prevents the executing portion from executing the state transition prosecution. After completion of writing into the main memory the buffered store data units which have been issued prior to the occurrence of the state transition prosecution, the microprogram controller makes the executing portion execute the state transition prosecution.

This means that execution of the instruction is interrupted and degrades the high speed performance of the computer system.

Considering that an error recoverable by the retry almost does not occur in the computer systems due to progress in computer technology, it is disadvantageous to delay execution of the state transition prosecution for the purpose of insurance of recovering from such a rare error.

SUMMARY OF THE INVENTION

Therefore, it is an object of the invention to provide an electronic computer system of a microprogram control type for enabling the instruction retry from a checkpoint, where a state transition prosecution resulting in cancellation of the checkpoint can be executed, without waiting for completion of store requests issued prior to occurrence of the state transition prosecution but with insurance of the possibility of a decision of whether or not the instruction can be retried on occurrence of an error during the instruction.

The present invention is applicable to an electronic computer system comprising a main memory for storing a plurality of programs and data and a processor for processing the programs, each program comprising a succession of instructions. The succession of instructions including an instruction as a specific instruction which has a state transition prosecution requiring cancellation of a checkpoint. The processor comprises an instruction controlling circuit for fetching selected instructions and for delivering each of the fetched instructions as a delivered instruction and an execution request for the delivered instruction; an executing circuit for executing the delivered instruction according to microsteps of a microprogram of a microprogram control circuit to produce a succession of store data units as data signals and a succession of corresponding store indications; store request producing circuit coupled to the executing circuit and to the microprogram control circuit for producing a succession of store as request signals corresponding to the succession of store data units as data signals according to the microsteps of the microprogram; and a main memory control circuit coupled to the executing circuit, to the store request producing circuit and to the main memory, for successively buffering the request signals as buffered store request signals and for buffering the data signals as buffered data in response to the store indications, the main memory control circuit responsive to write enabling signals from the main memory for successively delivering the buffered request signals together with the buffered data signals to the main memory as delivered request signals and delivered data signals. The main memory writes the delivered data signals thereinto according to the delivered request signals. The microprogram control circuit is responsive to an execution request and establishes the checkpoint at a start point of the microprogram so as to enable the executing circuit to retry the delivered instruction from the checkpoint when an error occurs during execution of the delivered instruction. The microprogram control circuit makes the executing circuit execute the state transition prosecution when state transition prosecution is required during execution of the delivered instruction. According to the present invention, the microprogram control circuit comprises a state transition prosecution control circuit responsive to the requirement of the state transition prosecution for producing a first indication for producing a non-store request as one of the request signals and a second indication for producing an imitative store data unit as one of the data signals before making the executing circuit execute the state transition prosecution. The request producing circuit and the executing circuit produce the imitative store request and the non-store data unit in response to the first and the second indications, respectively. The main memory rejects writing the imitative store data unit in the delivered data signals when a corresponding one of the delivered request signals is the non-store request.

Responsive to an instruction retry request, the microprogram control circuit controls the executing circuit and the store request producing circuit so as to retry the delivered instruction from the checkpoint. The main memory control circuit comprises a detecting circuit responsive to an error signal, for detecting the non-store request in the buffered request signals. When the non-store request is not detected in the buffered request signals, the memory control circuit delivers the buffered request signals and the buffered data signals to the main memory as the delivered request signals and the delivered data signals. Thereafter, the detecting circuit produces the instruction retry request to the microprogram control circuit.

When the detecting circuit detects the non-store request in the buffered request signals, the detecting circuit produces a system down signal to stop the computer system.

DESCRIPTION OF A PREFERRED EMBODIMENT

Figure 1:
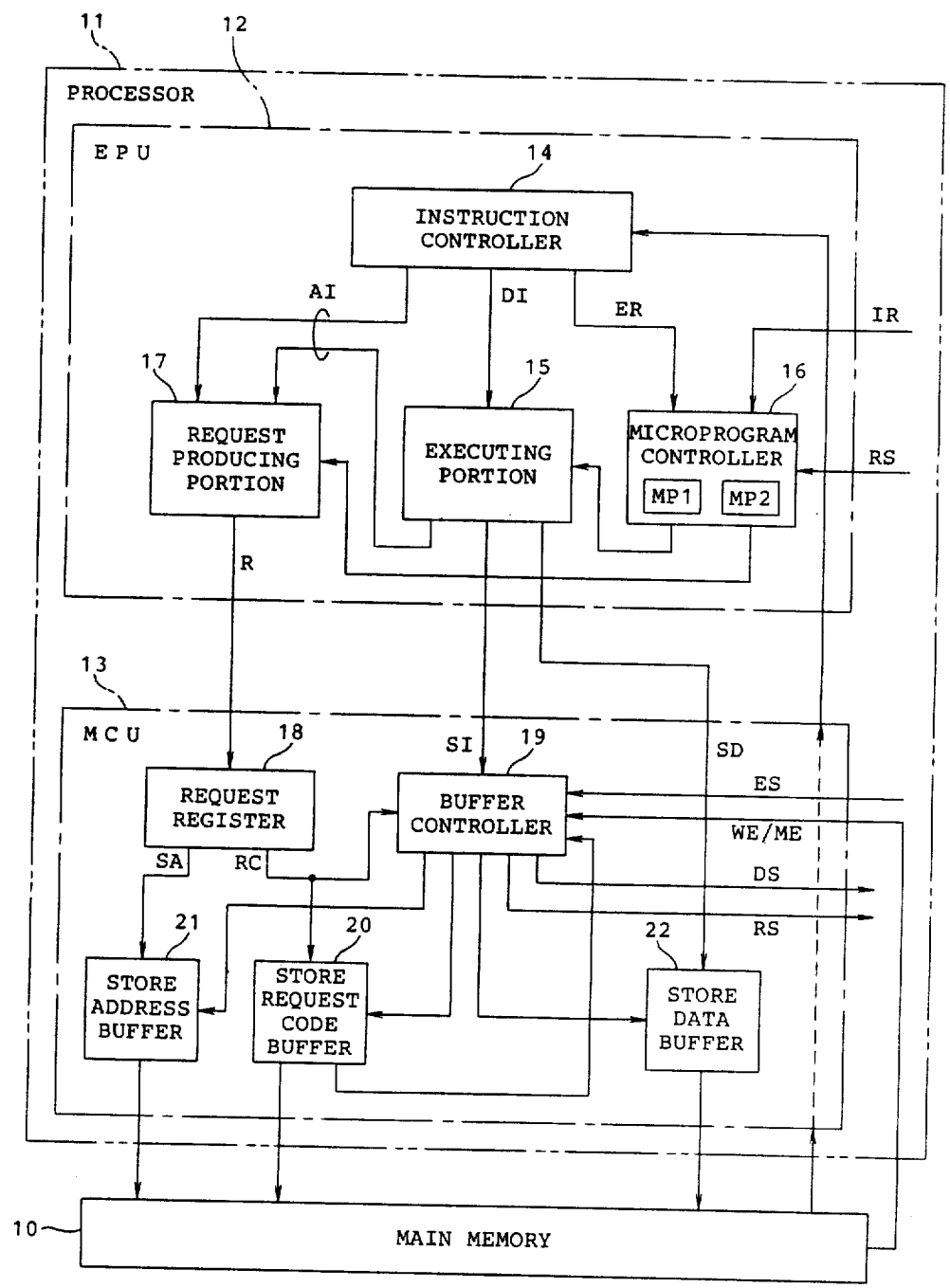
FIG. 1 is a schematic diagram of an electronic computer system according to one embodiment of the present invention.

Referring to FIG. 1, the electronic computer system shown therein comprises a main memory 10 for storing a plurality of programs and data and a processor 11 for processing the programs, as is similar to the known computer system. Each program comprises a succession of instructions. The succession of instructions includes an instruction as a specific instruction which has a state transition prosecution requiring cancellation of a checkpoint.

The processor 11 comprises an execution processing unit (EPU) 12 and a main memory controller, that is, a memory control unit (MCU) 13. The execution processing unit 12 comprises an instruction controller 14, an executing portion 15, a microprogram controller 16, and a request producing portion 17.

The instruction controller 14 successively fetches selected instructions from the main memory 10 and interprets them. Each of the fetched instructions is delivered to the executing portion 15 as a delivered instruction (DI). While, an execution request (ER) for the delivered instruction is delivered to the microprogram controller 16 from the instruction controller 14.

The executing portion 15 successively executes the delivered instruction according to microsteps of a microprogram by the microprogram controller 16 responsive to the execution request and produces a succession of store data units (SD) as data signals and a succession of corresponding store indications (SI).

The request producing portion 17 is coupled to the instruction controller 14, the executing portion 15 and the microprogram controller 16 and receives address information (AI). The request producing portion 17 produces requests (R) including as a request signal a succession of store request corresponding to the store data units under control of the microprogram controller 16.

Each of the store requests comprises a store request code and a store address. The store address is prepared from the address information.

The microprogram controller 16 has a first microprogram MP1 and a second microprogram MP2. Responsive to the execution request, the microprogram controller 16 starts to control the executing portion 15 and the request producing portion 17 by the first microprogram MP1. Also, the checkpoint is established at a start of the microprogram control for the delivered instruction so as to enable the executing portion 15 to retry the delivered instruction from the checkpoint when an error occurs during execution of the delivered instruction.

The microprogram controller 16 is also supplied with an interruption request (IR) from any external device and controls the executing portion 15 and the request producing portion 17 to process the interruption request.

When a requirement of the state transition prosecution occurs during execution of the delivered instruction, the microprogram controller 16 controls the executing portion 15 and the request producing portion 17 by use of the second microprogram MP2 as a state transition prosecution controller.

Figure 2:
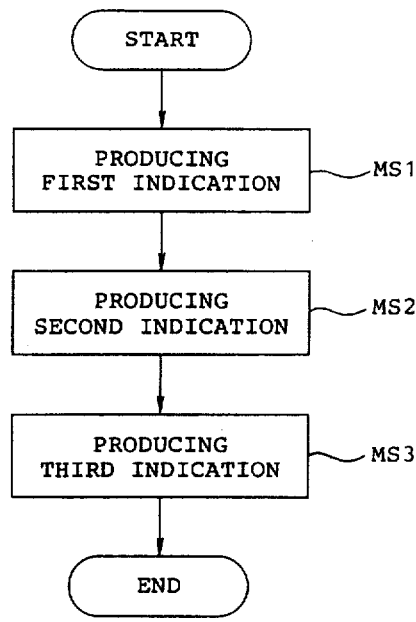
FIG. 2 is a view illustrating a flow chart for controlling the state transition prosecution by a microprogram controller in FIG. 1.

Referring to FIG. 2, the microprogram controller 16 produces a first indication for producing a non-store request instead of the store request as one of the request signals at first step MS1 of the second microprogram MP2. The non-store request is imitative of the store request as one of the request signals and therefore will be referred to as an imitative store request hereinafter. The first indication is applied to the request producing portion 17. Responsive to the first indication, the request producing portion 17 produces the imitative store request as one of the request signals. The imitative store request comprises a non-store request code which is imitative of the store request code and a non-store address which is imitative of the store address. The store request code and the imitative store request code will collectively be called a request code, and the store address and the imitative store address will collectively be called an address signal. The imitative store request is delivered from the request producing portion 17 to the main memory controller 13 as one of the succession of request signals.

The microprogram controller 16 further produces a second indication for producing a non-store data unit instead of the store data unit as one of the data signals at second step MS2 in the second microprogram MP2. The non-store data unit is imitative of the store data unit as one of the data signals and therefore will be referred to as an imitative store data unit hereinafter. The second indication is delivered to the executing portion 15. Responsive to the second indication, the executing portion 15 produces the imitative store data unit as one of the data signals together with one of the store indications. The imitative store data unit is delivered to the main memory controller 13 as one of the succession of data signals.

At third step MS3 in the second microprogram MP2, the microprogram controller 16 produces a third indication for executing the state transition prosecution. The third indication is applied to the executing portion 15. Responsive to the third indication, the executing portion 15 executes the state transition prosecution. As a result, the checkpoint is cancelled. Thereafter, the microprogram controller 16 again uses the first microprogram MP1 and controls the executing portion 15 and the request producing portion 17.

Returning to FIG. 1, the main memory controller 13 is coupled to the execution portion 15, the request producing portion 17 and the main memory 10, and successively buffers the request signals as buffered request signals and also buffers the data signals as buffered data signals in response to the store indications one after another.

Responsive to successive write enabling signals (WE) from the main memory 10, the main memory controller 13 successively delivers the buffered request signals together with the buffered data signals to the main memory 10 so as to write the store data units into the main memory 10.

The main memory 10 writes the store data in the buffered request signals therein according to the store requests in the buffered request signals. However, when one of the buffered request signals is the imitative store request, the main memory 10 rejects the corresponding imitative store data unit. Thus, the imitative store data unit is not written into the main memory 10.

In more detail, the main memory controller 13 comprises a request register 18, a buffer controller 19, a store request code buffer 20, a store address buffer 21, and a store data buffer 22.

The request register 18 is coupled to the request producing portion 17, and receives and holds the requests one after another.

The store request code buffer 20 is coupled to the request register 18 and buffers the request codes (RC) through the request register 18. The store request code buffer 20 comprises, for example, 16 words and can, therefore, hold 16 request codes as the buffered request codes.

The store address buffer 21 is also coupled to the request register 18 and buffers the address signals (SA) through the request register 18. The store address buffer 21 comprises 16 words for storing 16 address signals as the buffered address signals.

The store data buffer 22 is coupled to the executing portion 15 and buffers the data signals one after another as buffered data signals. The store data buffer 22 comprises one word for holding one data signal as one of the buffered data signals.

The buffer controller 19 is coupled to the executing portion 15 and the request register 18. The buffer controller 19 receives the request code from the request register 18 as a received request code. When the received request code is the store request code or the imitative store request code, the buffer controller 19 instructs the store address buffer 21 to buffer the address held in the request register 18 as one of the buffered addresses.

At the same time, the buffer controller 19 instructs the store request code buffer 20 to buffer the request code held in the request register 18 as one of the buffered request codes.

When the buffer controller 19 receives one of the store indications from the executing portion 15, the buffer controller 19 instructs the store data buffer 22 to buffer a corresponding one of the data signals supplied from the executing portion 15 as one of the buffered data signals.

The buffered request code, the buffered address signals and the buffered data signal will collectively be referred to as a buffered information set.

Thereafter, when the buffer controller 19 receives one of the write enabling signals from the main memory 10, the buffer controller 19 instructs the store request code buffer 20, the store address buffer 21, and the store data buffer 22 to send out the first buffered one of the buffered information sets to the main memory 10 so as to write the first buffered store data unit into the main memory 10.

When an error occurs in the computer system, for example, when the execution processing unit 12 excludes the main memory 10 during execution of the delivered instruction, an error signal is produced from a diagnostic unit (not shown). The error signal (ES) is supplied to the buffer controller 19. Then, the buffer controller 19 processes the error as an imitative store request detector according to steps illustrated in FIG. 3.

Figure 3:
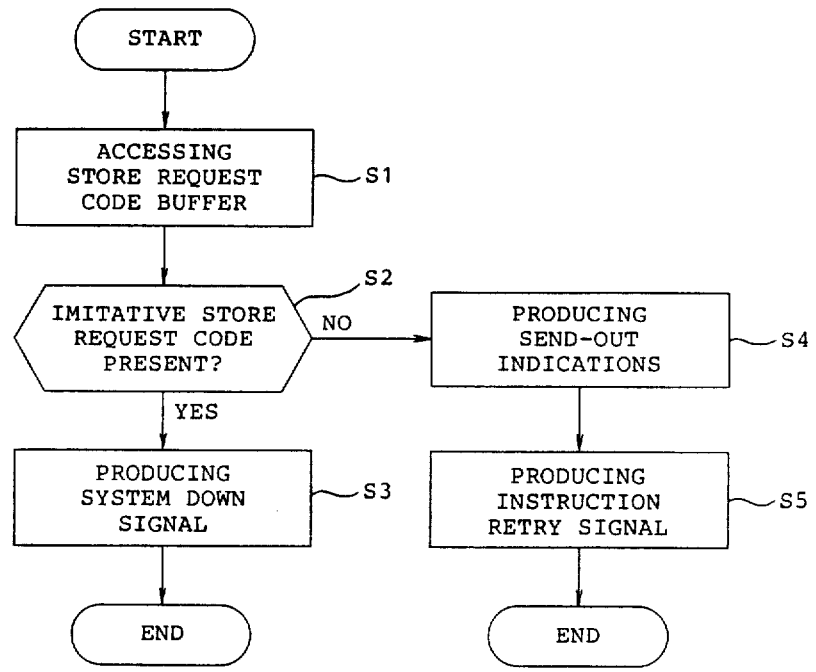
FIG. 3 is a view illustrating a flow chart for processing an error caused in the computer system excluding a main memory by a buffer controller in FIG. 1.

Referring to FIG. 3, the buffer controller 19 accesses the store request code buffer 20 to read the buffered request codes held in the store request code buffer 20 at first step S1. Then, the buffer controller 19 detects whether or not the imitative store request code is present in the buffered store request codes at second step S2. When the imitative store request code is detected, the buffer controller 19 produces a system down signal (DS) at third step S3. This is because presence of the imitative store request code means that the state transition prosecution has been already executed and that retry is impossible. The system down signal is delivered to a system control unit (not shown). Then, the system control unit stops operation of the computer system.

When the imitative store request code is not detected or is absent in the buffered request codes, the buffer controller 19 produces indications for the store request code buffer 20, the store address buffer 21 and the store data buffer 22 to send out to the main memory 10 the buffered request codes, the buffered address signals and the buffered data signals, respectively, at fourth step S4. Therefore, the buffered data signals are written into the main memory 10. Then, the buffer controller 19 produces an instruction retry signal (RS) at fifth step S5. The instruction retry signal is applied to the microprogram controller 16. Responsive to the instruction retry signal, the microprogram controller 16 uses the first microprogram MP1 and controls the executing portion 15 and the request producing portion 17 for retrying the delivered instruction from the checkpoint.

When an error occurs in the main memory 10, the main memory 10 delivers a memory error signal (ME) to the buffer controller 19 in the main memory controller 13. Then, the buffer controller 19 also produces the system down signal in response to the memory error signal.

What is claimed is:

1. In an electronic computer system comprising:
a main memory for storing a plurality of programs and data;
a processor for processing said programs, each of said programs comprising a succession of instructions, said succession of instructions including a specific instruction which has a state transition prosecution requiring cancellation of a checkpoint;
instruction controlling means for fetching selected instructions and for delivering each of said fetched instructions as a delivered instruction and an execution request for said delivered instruction;
executing means for executing said delivered instruction according to microsteps of a microprogram of a microprogram control means to produce a succession of store data units as data signals and a succession of corresponding store indications;
store request producing means, coupled to said executing means and to said microprogram control means, for producing a succession of store requests as request signals corresponding to said succession of store data units as data signals according to said microsteps of said microprogram; and
main memory control means, coupled to said executing means, to said store request producing means and to said main memory, for successively buffering said request signals as buffered request signals and for buffering said data signals as buffered data signals in response to said store indications, said main memory control means responsive to write enabling signals from said main memory for successively delivering said buffered request signal together with said buffered data signals to said main memory as delivered request signals and delivered data signals, said main memory writing said delivered data signals thereinto according to said delivered request signals;
said microprogram control means responsive to an execution request for establishing a checkpoint at a start point of said microprogram so as to enable said executing means to retry said delivered instruction from said checkpoint when an error occurs during execution of said delivered instruction, said microprogram control means causing said executing means to execute state transition prosecution on occurrence of an instruction requiring state transition prosecution during execution of said delivered instruction; wherein
said microprogram control means comprises state transition prosecution control means, responsive to occurrence of said state transition prosecution, for producing a first indication for producing a non-store request as one of said request signals and a second indication for producing an imitative store data unit as one of said data signals before causing said executing means to execute said state transition prosecution;
said store request producing means and said executing means producing said non-store request and said imitative store data unit in response to said first and said second indications, respectively; and
said main memory rejecting writing said imitative store data unit, in said delivered data signals, when a corresponding one of said delivered request signals is said non-store request.

2. An electronic computer system as claimed in claim 1, wherein
said microprogram control means, responsive to an instruction retry request, controls said executing means and said store request producing means so as to retry said delivered instruction from said checkpoint, and wherein
said main memory control means comprises detecting means, responsive to an error signal, for detecting said non-store request in said buffered request signals, said memory control means delivering said buffered request signals and said buffered data signals to said main memory as said delivered request signals and said delivered data signals when said non-store request is absent from said buffered request signals and, thereafter, said detecting means sending said instruction retry request to said microprogram control means.

3. An electronic computer system as claimed in claim 2, wherein said detecting means produces a system down signal to stop said computer system when said detecting means detects said non-store request in said buffered request signals.

* * * * *